Patented July 9, 1940

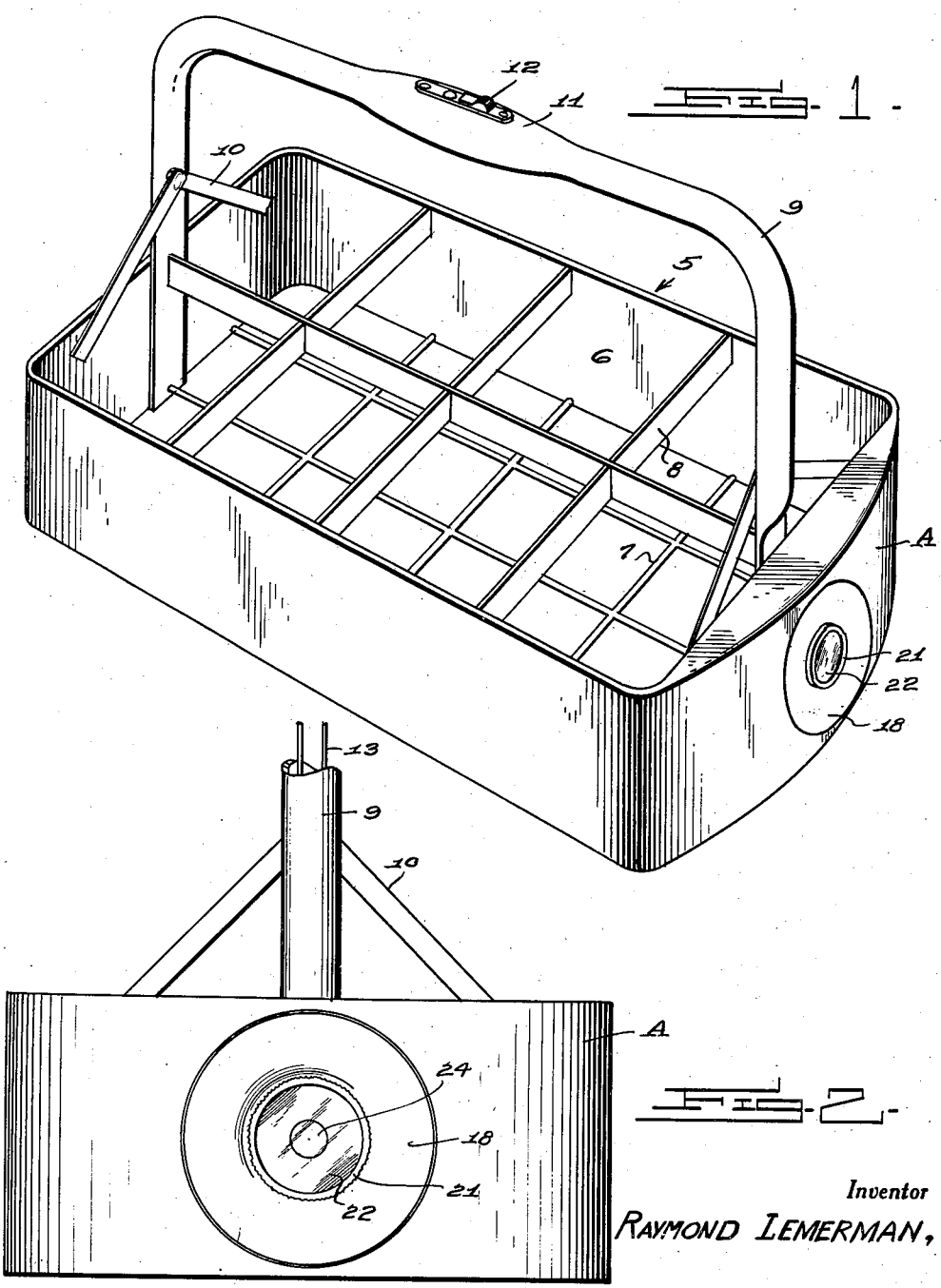

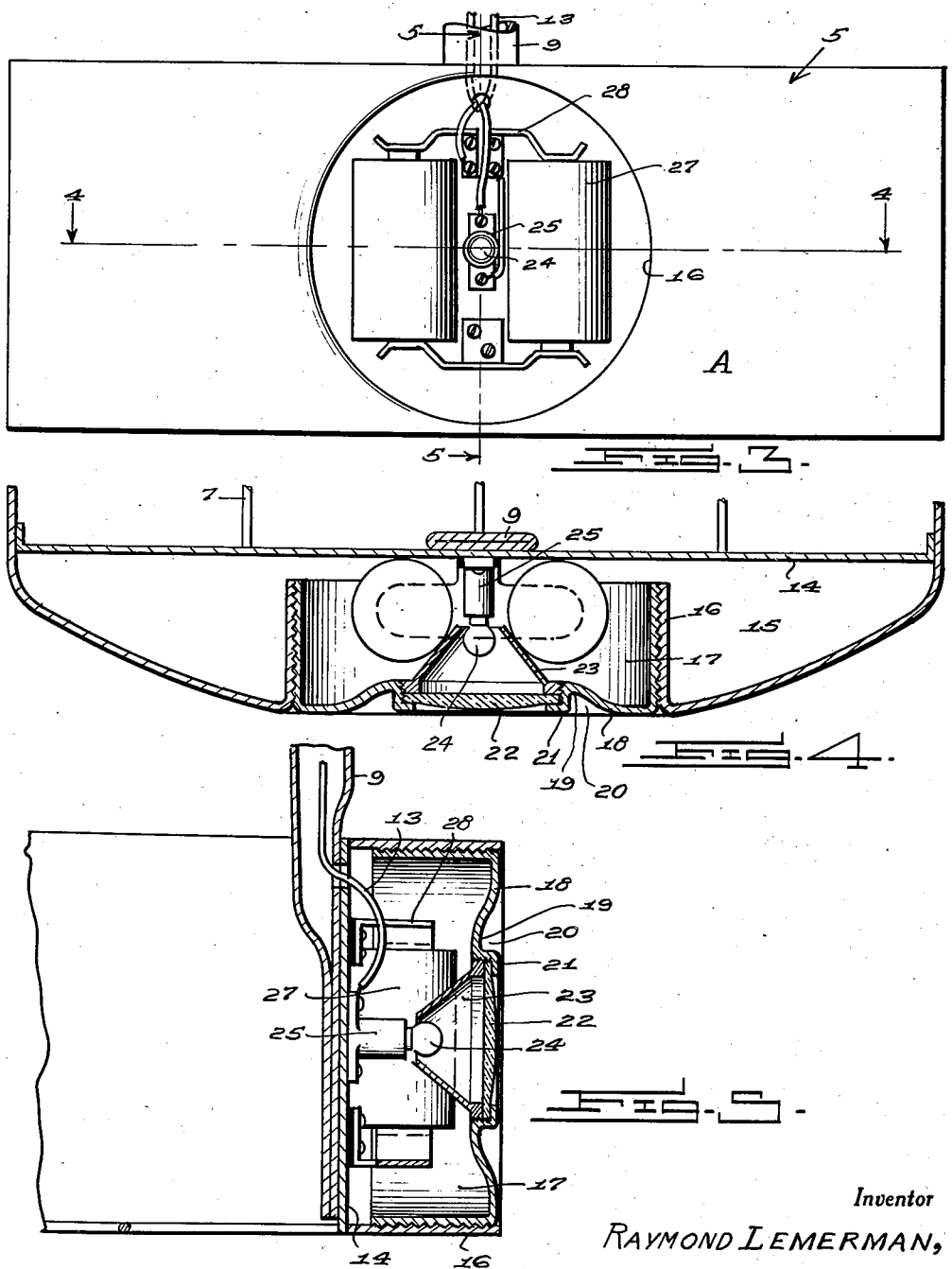

2,207,017

UNITED STATES PATENT OFFICE 2,207,017

MILK BOTTLE CARRIER

Raymond Lemerman, Newark, N. J.

Application February 8, 1939, Serial No. 255,319

4 Claims. (Cl. 240—6.4)

This invention relates to milk bottle carriers especially constructed for use by persons engaged in making delivery of milk from house to house and which usually takes place at night or in the dark. The present invention has for its primary object, the provision of a device of this character which not only will permit carrying of a number of bottles with safety and ease, but will also provide an efficient electric illuminating device so that the deliveryman may at will have light sufficient to permit rapid delivery of milk and collection of empty bottles and also may be used to locate house numbers and other purposes which may be within the need of the deliveryman while engaged in his work.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a perspective view illustrating a milk bottle carrier constructed in accordance with my invention.

Figure 2 is a fragmentary end elevation illustrating the illuminating device.

Figure 3 is an end view showing a part of the illuminating means removed to expose the mounting of the batteries in the carrier.

Figure 4 is a sectional view taken on the line 4—4 of Figure 3.

Figure 5 is a sectional view taken on the line 5—5 of Figure 3.

Referring in detail to the drawings, the numeral 5 indicates a rack for the accommodation of a number of bottles, consisting of vertical integrally connected walls 6, a bottom wall 7 of skeleton formation, cross members 8 providing spaces to accommodate bottles and a handle 9 connected to end walls of the rack and further braced to said end walls by braces 10. The handle 9 extends lengthwise of the rack 5 and is preferably of hollow formation having located in its grip portion 11 a switch 12 of a conventional construction, that is, capable of being either pressed manually to close a circuit or to be slid for completing the circuit so that the electric illuminating means will remain illuminated as long as desired. Of course, it being understood that the electric illuminating means can be flashed on and off by the pressing and releasing of the switch 12. The handle 9 being of hollow formation allows the conductor wires 13 to extend to the switch 12 from one end of the rack 5.

It is preferable that the vertical walls of the rack be of solid formation and may be utilized for display for advertising purposes.

One of the end walls has an arcuate curvature thereto, as clearly shown in Figure 1. This arcuately curved end wall is designated by the character A and will be known as a guard for the electric illuminating means.

Arranged inwardly of the guard A is a partition 14 being suitably secured to opposite side walls of the rack and defining between itself and the guard A a chamber 15. The guard A has an opening and extending inwardly from said guard A about the opening is an internally threaded annular collar 16 located within the chamber 15. The collar 16 has threaded therein a collar 17 one end of which is closed by a supporting wall 18. The supporting wall 18 is curved or offset, as shown at 19, to form a pocket 20 of annular formation which surrounds a flanged portion 21 formed on said supporting wall 18. The flanged portion defines an opening for the reception of a lens 22 also is screw threaded to have threaded therein a reflector 23 which acts to retain the lens 22 within the flanged portion 21, the latter being knurled to permit a firm grip to be obtained thereon when desiring to thread the collar 17 within the collar 16 or when desiring to unthread the collar 17 from the collar 16. The reflector 23 is of conical shape having an opening in its apex portion to receive an electric lamp 24 mounted within an electric lamp socket 25 carried by the partition 14.

The partition 14 also supports dry cells or batteries 27 through spring contact elements 28. The contact elements 28 are connected to the electric conductors 13 and to the lamp socket 25 so that on closing of the switch 12 the electric lamp 24 will be illuminated.

By referring to Figures 1, 2 and 4 it will be seen that the lens 22 due to the construction described will be arranged within a plane slightly inwardly of the outermost portion of the guard A so as to be protected. Further, it will be seen that when it is desired or necessary to change dry cells or batteries it is only necessary to thread the collar 17 out of the collar 16 carrying therewith the lens 22 and reflector leaving the batteries fully exposed so that they may be conveniently removed and renewed by others.

The electric illuminating means arranged in the end of the rack as described permits the deliveryman while carrying the rack to have a very efficient way of illuminating his path as well as locating house numbers and the places for the placing of milk bottles and the collection of empty milk bottles.

The annular pocket 20 formed in the supporting wall 18 of the device will allow a person's fingers to obtain a firm grip upon the flanged portion 21 when desiring to either thread the collar 17 into or out of the collar 16. Further, through the construction as shown and described it will be clearly apparent that it is not necessary to disturb either the lens or the reflector from its mounting when desiring to make battery or dry cell changes in the device.

It is believed that the foregoing description, when taken in connection with the drawings will fully set forth the construction and advantages of this invention to those skilled in the art to which such a device relates, so that further detailed description will not be required.

Having described the invention, what is claimed is:

1. A milk bottle carrier comprising a rack including at one end thereof an arcuately curved guard wall having an opening, a partition in said rack rearwardly of the opening and spaced therefrom, a mounting carried by the guard wall and extending inwardly of the latter toward said partition, a supporting means carried by said mounting and removable therefrom, a lens and a reflector carried by said supporting means, electric illuminating means carried by said partition and adapted to cast rays of light through said lens, and a switch carried by said rack for the control of the electric illuminating means.

2. A milk bottle carrier comprising a rack including a handle and an arcuately curved guard wall at one end thereof and provided with an opening, a partition in said rack and spaced from the opening, an internally screw threaded collar formed on the guard wall and extending toward the partition, a support including a collar threaded into the first named collar and having a flanged portion defining an opening and a seat, a lens mounted in the seat, a reflector threaded in said flanged portion and retaining the lens in the seat and having an opening, an electrical illuminating means mounted on said partition and including an electric lamp extending into the reflector and an electric switch mounted on the handle.

3. A milk bottle carrier comprising a rack including a handle and an arcuately curved guard wall at one end thereof and provided with an opening, a partition in said rack and spaced from the opening, an internally screw threaded collar formed on the guard wall and extending toward the partition, a support including a collar threaded into the first named collar and having a flanged portion defining an opening and a seat, a lens mounted in the seat, a reflector threaded in said flanged portion and retaining the lens in the seat and having an opening, an electrical illuminating means mounted on said partition and including an electric lamp extending into the reflector and an electric switch mounted on the handle, said supporting member adjacent its flanged portion being offset to form an annular indentation surrounding the flanged portion to permit gripping of the latter, said flanged portion being knurled.

4. A milk bottle carrier comprising a rack including solid walls with one of the end walls thereof arcuately curved to form a guard wall having an opening, a handle for said rack, a mounting carried by said guard wall and extending inwardly thereof, a partition in said rack and spaced from said mounting, a supporting plate including a portion threaded in said mounting and a flanged portion defining an opening and a seat, a lens received in said seat, a reflector threaded in the flanged portion and retaining the lens therein and provided with an opening, electric illuminating means carried by the partition and including an electric lamp extending into the reflector, said supporting plate being offset to form an annular depression surrounding the flanged portion to permit a grip to be obtained thereon, and a switch for the electric illuminating means carried by the handle.

RAYMOND LEMERMAN.